(No Model.)
R. P. ELLIOTT.
MIRROR SUPPORTING AND ADJUSTING DEVICE.
No. 429,430. Patented June 3, 1890.
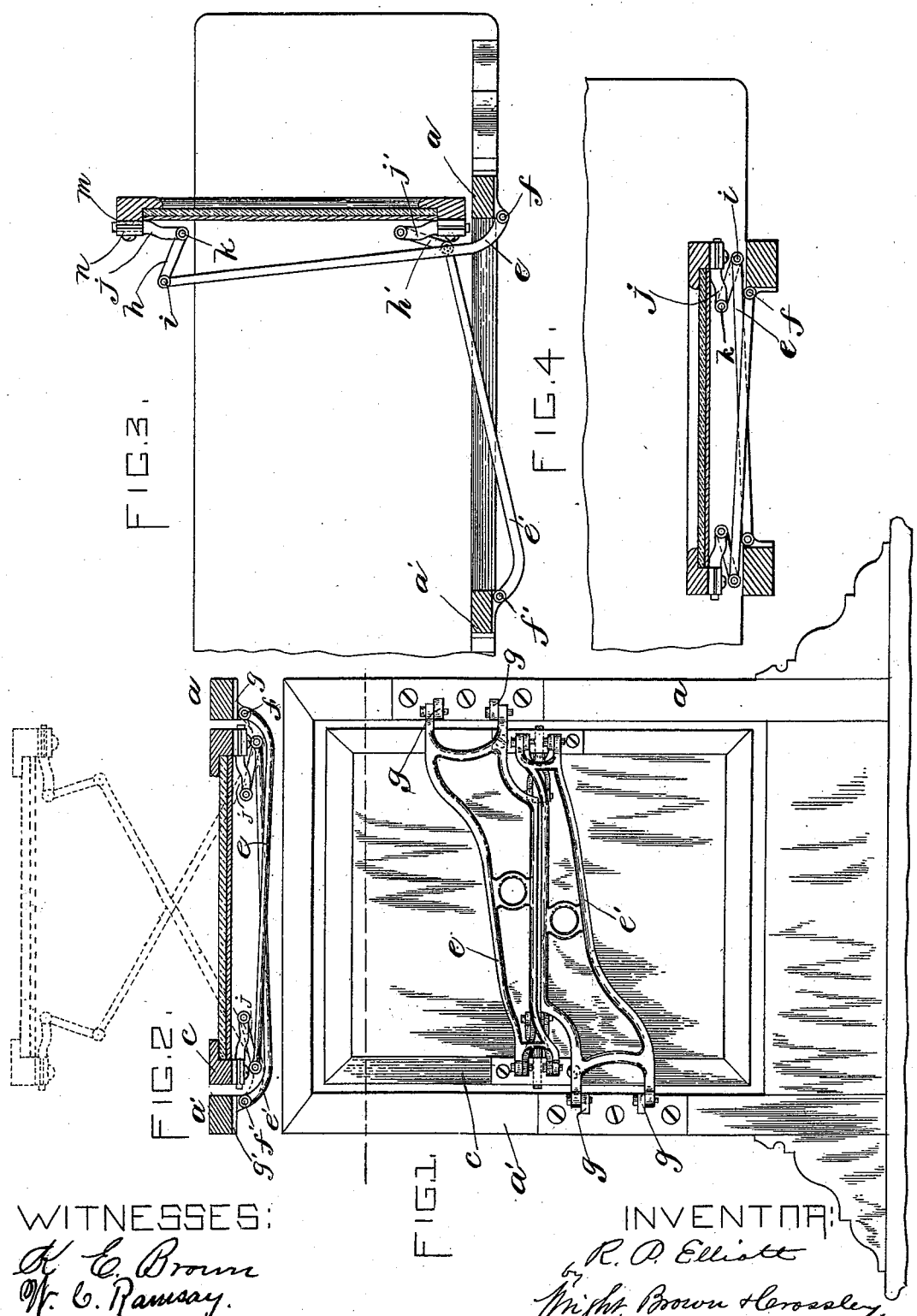

UNITED STATES PATENT OFFICE.

RICHARD P. ELLIOTT, OF SOMERVILLE, MASSACHUSETTS, ASSIGNOR TO CHARLES H. FRENCH, OF NASHUA, AND DAVID HEALD, OF MILFORD, NEW HAMPSHIRE.

MIRROR SUPPORTING AND ADJUSTING DEVICE.

SPECIFICATION forming part of Letters Patent No. 429,430, dated June 3, 1890.

Application filed August 16, 1889. Serial No. 321,047. (No model.)

*To all whom it may concern:*

Be it known that I, RICHARD P. ELLIOTT, of Somerville, in the county of Middlesex and State of Massachusetts, have invented certain new and useful Improvements in Mirror Supporting and Adjusting Devices, of which the following is a specification.

This invention relates chiefly to means for supporting a toilet-mirror on a bureau or other like article of furniture in such manner that the mirror can be moved bodily forward to bring it nearer the front of the bureau, or turned laterally so that either vertical edge will stand out farther than the other, and the mirror will face in any desired direction.

The invention has for its object to provide improved means whereby these results may be attained, and whereby the mirror may be tipped on a horizontal axis to give it any desired vertical inclination in any of the positions it may assume.

To these ends the invention consists in the improvements, which I will now proceed to describe and claim.

In the accompanying drawings, forming a part of this specification, Figure 1 represents a rear elevation of a portion of a mirror-frame and of portions of two uprights, or of a frame surrounding the mirror and attached to the top of a bureau, said uprights and mirror-frame being shown as connected by the devices embodying my invention. Fig. 2 represents a section on line $x\,x$, Fig. 1, looking downwardly, and showing a top plan view of the supporting and adjusting devices, the mirror and supporting devices being shown in full lines as pushed back and in dotted lines as pulled out. Fig. 3 represents a similar section showing the mirror pulled out at one edge, so that its front is about at right angles with the back of the bureau. Fig. 4 represents a section similar to Fig. 2, showing a modification.

The same letters of reference indicate the same parts in all of the figures.

In the drawings, $a\,a'$ represent vertical standards or uprights attached to a bureau $b$. Said standards may be the sides of a frame, such as is usually attached to a bureau as a support for a mirror; or they may be independent of each other and not connected above the mirror.

$c$ represents the mirror-frame, which is adapted to stand between the standards $a\,a'$, as shown in Figs. 1, 2, and 3, or in front of the same, as shown in Fig. 4.

The mirror supporting and adjusting devices comprising my present invention are two swinging arms or brackets $e\,e'$. The arm or bracket $e$ is connected at one end by vertical pivots $f$ with ears $g$ on a bracket attached to the standard $a$, and has at its free end a link $h$, which is connected therewith by a vertical pivot $i$, the outer end of said link being connected by a vertical pivot $k$ with a trunnion-piece $j$, which forms a part of a friction-hinge whereby the arm or bracket is connected with one of the vertical pieces of the mirror-frame, the said arm or bracket extending across the back of the mirror and being connected with the side piece of the mirror-frame, which is farthest from the standard $a$. The other arm or bracket $e'$ is connected at one end by vertical pivots $f'$ with ears $g'$ on the standard $a'$, and extends across the back of the mirror, and is connected with the side piece of the mirror-frame farthest from the standard $a'$ by a link $h'$ and trunnion-piece $j'$, similar to the link and trunnion-piece above described.

It will be seen that the two arms or brackets extending in opposite directions from their pivoted ends across the back of the mirror and connected at their swinging ends by links to the trunnion-pieces $j\,j'$ enables the mirror to be moved bodily outward, as shown by dotted lines in Fig. 2, so that the reflecting-surface of the mirror can be brought nearer the front of the bureau, and also enables either edge of the mirror to be swung outwardly, thus enabling the reflecting-surface to face in any desired direction within certain limits, the maximum displacement of either edge of the mirror being such as to enable the reflecting-surface to stand at about a right angle with the back of the mirror, as shown in Fig. 3. The mirror can, therefore, swing horizontally on two centers, one of which is the pivoted end of one arm or bracket and the other the pivoted end of the other arm or bracket. It will be observed, however, that the mirror when moved bodily outward cannot swing laterally to any material extent, the only lateral movements permitted being those on the centers $f f'$, so that the mirror-frame cannot swing to either side sufficiently to strike the wall against which the bureau stands.

The trunnion-pieces $j j'$, to which the outer ends of the links $h h'$ are pivoted, have their outer ends reduced and made cylindrical, said ends being fitted between plates $m m$, bearing on and attached to the mirror-frame, and outer plates $n n$, attached to the plates $m m$ by screws. Said plates and the trunnions constitute friction-hinges adapted to hold the mirror either in a vertical position or at any desired angle from a vertical position, the trunnions being in line with each other and constituting a horizontal axis, on which the mirror may tip to throw its upper end out and its lower end in, or vice versa.

The inner portion of each arm or bracket is offset, as shown in Fig. 1, the offset end of the arm or bracket $e$ being raised, while the offset end of the arm or bracket $e'$ is depressed. The offset inner end of each arm or bracket affords room for the outer end of the other arm or bracket, said outer ends being correspondingly offset, the system of offsets permitting the described alignment of the trunnion-pieces.

In case it is not desirable to tip the glass to vary its vertical position the parts $j j'$ (here called the "trunnion-pieces") may be rigidly attached to the mirror-frame, or the links $h h'$ may be pivoted directly to the mirror-frame or to ears or suitable fixtures thereon.

In Fig. 4 I show the uprights $a a'$ located behind the mirror-frame, the arms or brackets $e e'$ being correspondingly shortened and pivoted to ears attached to said uprights.

I claim—

1. The improved mirror supporting and adjusting devices consisting of the two arms or brackets formed at their inner ends for pivotal connection with fixed supports, the links connected by pivots with the outer ends of said arms, and connecting-pieces, as $j$, pivoted to the outer ends of said links and formed for connection with a mirror-frame, all comprised substantially as set forth.

2. The improved mirror supporting and adjusting devices consisting of the two arms or brackets formed to be pivoted to fixed supports at their inner ends, the links pivoted to the outer ends of said arms or brackets, and the trunnion-pieces pivoted to the outer ends of the links and formed to enter horizontal sockets on a mirror-frame, as set forth.

3. The combination of a bureau or other like article of furniture, vertical standards $a a'$ thereon, a mirror-frame, two arms or brackets pivotally connected to said standards and extending from their pivoted ends in opposite directions across the back of the mirror-frame, links pivoted to the free ends of said arms or brackets, and means for connecting the outer ends of said links to the mirror-frame, as set forth.

4. The combination of a bureau or other like article of furniture, vertical standards $a a'$ thereon, a mirror-frame, two arms or brackets pivotally connected to said standards and extending from their pivoted ends in opposite directions across the back of the mirror-frame, links pivoted to the free ends of said arms or brackets, and trunnion-pieces pivoted to the outer ends of said links and engaged by friction-hinge members with the mirror-frame, as set forth.

5. The combination of a bureau or other like article of furniture, vertical standards $a a'$ thereon, a mirror-frame, two offset arms or brackets pivoted to said standards and extending in opposite directions across the back of the mirror-frame, and trunnion-pieces pivotally connected with the free ends of said arms or brackets and with the mirror-frame, the offset construction of said arms or brackets making the trunnion-pieces in alignment, as set forth.

In testimony whereof I have signed my name to this specification, in the presence of two subscribing witnesses, this 27th day of July, A. D. 1889.

RICHARD P. ELLIOTT.

Witnesses:
ARTHUR W. CROSSLEY,
A. D. HARRISON.